US006834269B1

(12) United States Patent
Bueche

(10) Patent No.: US 6,834,269 B1
(45) Date of Patent: Dec. 21, 2004

(54) FACTORY-INSTALLED SOFTWARE PURCHASE VERIFICATION KEY

(75) Inventor: Charles L. Bueche, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/511,200

(22) Filed: Feb. 23, 2000

(51) Int. Cl.[7] .............................................. G06F 17/60
(52) U.S. Cl. ..................................... 705/56; 717/174
(58) Field of Search ........................ 705/50–52, 54–59, 705/64, 71–75; 713/202, 1–2, 100, 191, 150–155; 717/100, 103, 126, 168–178

(56) References Cited

U.S. PATENT DOCUMENTS

| | | | | |
|---|---|---|---|---|
| 5,598,470 | A | * 1/1997 | Cooper et al. .................. | 380/4 |
| 5,894,571 | A | * 4/1999 | O'Connor .................... | 395/652 |
| 5,915,093 | A | * 6/1999 | Berlin et al. ........... | 395/200.49 |
| 5,991,399 | A | 11/1999 | Graunke et al. ............... | 380/4 |
| 6,000,832 | A | 12/1999 | Franklin et al. ....... | 364/479.02 |
| 6,005,939 | A | 12/1999 | Fortenberry et al. .......... | 380/21 |
| 6,012,100 | A | 1/2000 | Frailong et al. ............ | 709/250 |
| 6,167,383 | A | * 12/2000 | Henson ....................... | 705/26 |
| 6,247,128 | B1 | * 6/2001 | Fisher et al. ................ | 713/100 |
| 6,321,262 | B1 | 11/2001 | Springer ..................... | 709/223 |
| 6,389,403 | B1 | * 5/2002 | Dorak, Jr. .................... | 705/52 |
| 6,427,091 | B1 | 7/2002 | Davis et al. ................ | 700/115 |

FOREIGN PATENT DOCUMENTS

EP 0 921 487 A2 * 6/1999 ........... G06F/17/60

OTHER PUBLICATIONS

Jaeger, Flexible Control of Download Executable Content, 1997, vol. 58/02–B of Dissertation Abstract International, p. 799.*

"Rent–way to Offer Slingshot Prepaid Internet Access", Aug. 16, 2001, PR Newwire.*

"EIM Launches New Pre–paid Web Service", Jun. 24, 2002, Gulf News.*

R. Rivest; "*The MD5 Message–Digest Algorithm*"; MIT Laboratory for Computer Science and RSA Data Security, Inc., Apr. 1992; pp. 1–11.

Philip Mire; "*Public Key Infrastructure Master Key*"; U.S. patent application Ser. No.: 09/312,150; Filed May 14, 1999.

Donald Carroll; "*Disk Boot Sector, Software Copyright Enforcement*"; U.S. patent application Ser. No. 08/662,879; Filed Jun. 12, 1996.

* cited by examiner

*Primary Examiner*—James P. Trammell
*Assistant Examiner*—Mary Cheung
(74) *Attorney, Agent, or Firm*—Hamilton & Terrile, LLP; Stephen A. Terrile

(57) ABSTRACT

A software-generated purchase verification key is generated and stored on a computer at the factory where the make-to-order computer is assembled. The purchase verification key is provided by the computer to an ISP's host server. The host server attempts to verify the key. If the key is verified, the ISP establishes a pre-paid account for the owner of the computer.

23 Claims, 9 Drawing Sheets

FACTORY-INSTALLED SOFTWARE PURCHASE VERIFICATION KEY

BACKGROUND OF THE INVENTION

1. Field of the Invention

This invention relates generally to systems and methods for purchase identification and verification, and, more particularly, to a paperless system for confirming the purchase of goods, services, or other benefits along with the purchase of a computer system.

2. Description of the Related Art

A make-to-order computer manufacturer takes orders from a purchaser during an order transaction and accordingly assembles and configures a computer system conforming to the specifications requested by the purchaser. During the order transaction, the purchaser specifies the desired components of the computer system being ordered. At the time that the computer is assembled and configured at the factory, the computer manufacturer utilizes the information provided by the purchaser during the order transaction to assemble and configure the computer system according to the purchaser's specifications.

Make-to-order computer manufacturers have begun offering additional services, products, and other benefits along with the purchase of a computer. That is, at the time a purchaser specifies the desired components of the computer system during the order transaction, the purchaser can also specify additional services, products, or benefits that the purchaser wishes to purchase. For example, when the purchaser orders a computer system he can, at the same time, order and pay for pre-paid Internet Service Provider ("ISP") services.

ISP services are related to communications that occur over the Internet. The Internet is a vast system of computers and computer networks that are interconnected through communication links. The interconnected computers exchange information, which may include information necessary to conduct purchases and other commercial activities over the Internet.

Each of the thousands of individual networks and organizations that make up the Internet is run and financed separately. A key component of these individual networks and organizations are the individual local networks that provide Internet access for individual users, known as Internet Service Providers ("ISP's"). An individual user that wishes to access the Internet pays the ISP a fee, such as a monthly connection rate. In return, the ISP acts as the intermediary between the user and the network "backbone" servers that provide access to the various networks within the Internet.

The practice of offering additional products, services, and benefits along with the purchase of a computer system raises several security, logistics, and customer experience concerns. One such concern arises from the fact that a purchaser of the manufacturer's computer systems may or may not order the pre-paid ISP service or other offered products and services. It is therefore necessary to devise a means by which the ISP or other provider of goods or services can determine, when the purchaser attempts to access the ISP or other provider, whether or not the purchaser has pre-paid for particular goods or services that the purchaser is requesting. Another concern is that the ISP or other provider must have a manner of identifying the purchaser. If the purchaser has pre-paid for a limited amount of monthly ISP access or a limited amount of other goods or services, the provider must identify the purchaser so that goods or services requested in an amount exceeding the prepaid amount may be tracked and charged to the proper person. Ideally, these concerns should be addressed in a way that minimizes implementation costs and requires as little action as possible from the purchaser.

One approach for addressing the above concerns is to issue a purchase verification key or "product key" to the purchaser that confirms that the purchaser has pre-paid for goods or services. Valid product key values, when considered within the domain of valid and invalid product key values, must be rare enough that the likelihood of randomly generating a valid product key is extremely small. The product key may be printed on a certificate that is delivered with the computer system. Alternatively, the product key may be generated by computer and e-mailed to the purchaser. When the purchaser has received the computer, he manually types the product key into the computer when attempting to gain access to the pre-purchased goods or services. This approach presents several disadvantages. First, with either the printed or computer-generated approach, the customer will be denied access unless he properly types the product key into the computer when it is requested. This feature could prevent, due to a typographical error, the purchaser from accessing goods or services for which he has already paid. With the printed product key approach, there is also the risk that the certificate bearing the printed product key will become destroyed, lost, or otherwise inaccessible to the purchaser.

SUMMARY OF THE INVENTION

A software-generated purchase verification key ("product key") is generated and stored on a computer at the factory where the make-to-order computer is assembled. The purchase verification key and all input parameters except a shared, secret input parameter are provided by the computer to an ISP's host server. The host server attempts to verify the key. If the key is verified, the ISP establishes a pre-paid account for the owner of the computer.

BRIEF DESCRIPTION OF THE DRAWINGS

The present invention may be better understood, and its numerous objects, features, and advantages made apparent to those skilled in the art by referencing the accompanying drawings.

FIG. 3, including

The use of the same reference symbols in different drawings indicates identical items unless otherwise noted.

DETAILED DESCRIPTION

It is to be understood that the present invention may be utilized to verify and authorize on-line access to any service, product, or benefit that has been pre-paid with the order of a computer system. These services, products and benefits my include, but are not limited to, ISP services. For simplicity, the discussion below presents the preferred embodiment, wherein the pre-paid service is ISP service. It will be understood, however, that many other types of pre-paid services, products, and benefits fall within the scope of the present invention, such as access to on-line or standalone software, on-site or on-line technical support or maintenance agreements, and on-line banking, stock trading, bill-paying or other financial services.

Figure 1:
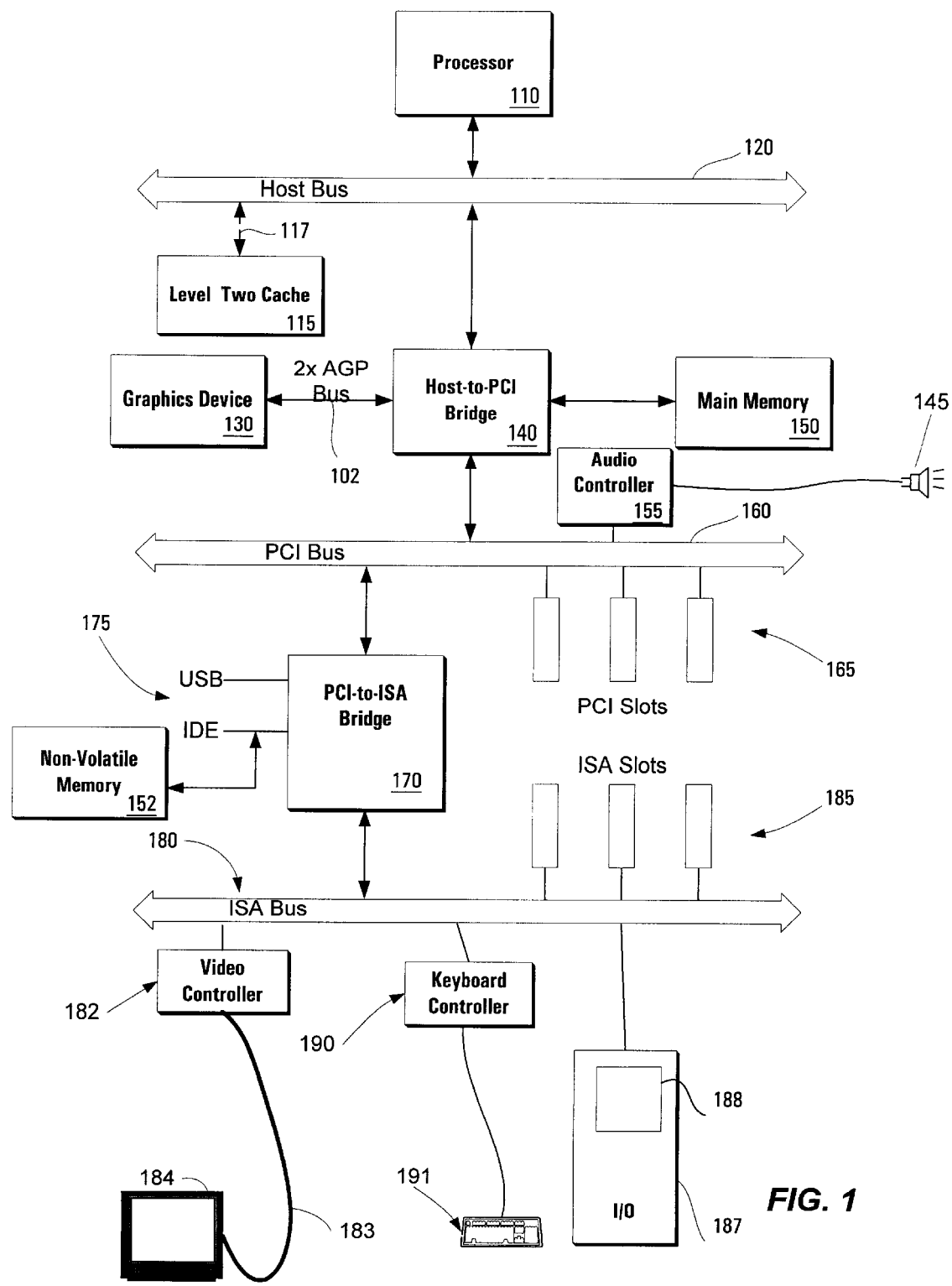
FIG. 1 is a block diagram of one embodiment of a computer system.

FIG. 1 is a block diagram of an exemplary computer system 100. The computer system 100 may be found in many forms including, for example, mainframes, minicomputers, workstations, servers, personal computers, internet terminals, notebooks and embedded systems. Personal computer (PC) systems, such as those compatible with the x86 configuration, include desktop, floor standing, or portable versions. A typical PC computer system 100 is a microcomputer that includes a microprocessor (or simply "processor") 110, associated memory 150 and control logic and a number of peripheral devices that provide input and output for the system 100. A typical computer system 100 may also include a cache 115 to facilitate quicker access between the processor 110 and main memory 150. The peripheral devices often include speaker systems 145, keyboards 191, and traditional I/O devices 187 that often include display monitors, mouse-type input devices, floppy and hard disk drives, CD-ROM drives, modems 188, and printers. The number of I/O devices 187 being added to personal computer systems continues to grow. For example, many computer systems also include network capability, terminal devices, televisions, sound devices, voice recognition devices, electronic pen devices, and mass storage devices such as tape drives, CD-R drives or DVDs. The peripheral devices usually communicate with the processor over one or more buses 120, 160, 180, with the buses communicating with each other through the use of one or more bridges 140, 170.

One skilled in the art will recognize that the foregoing components and devices are used as examples for sake of conceptual clarity and that various configuration modifications are common. For example, the audio controller 155 is connected to the PCI bus 160 in FIG. 1, but may be connected to the ISA bus 180 or other appropriate I/O buses in alternative embodiments. As further example, processor 110 is used as an exemplar of any general processing unit, including but not limited to multiprocessor units; host bus 120 is used as an exemplar of any processing bus, including but not limited to multiprocessor buses; PCI bus 160 is used as an exemplar of any input-output devices attached to any I/O bus; AGP bus 102 is used as an exemplar of any graphics bus; graphics device 130 is used as an exemplar of any graphics controller; and host-to-PCI bridge 140 and PCI-to-ISA bridge 170 are used as exemplars of any type of bridge. Consequently, as used herein the specific exemplars set forth in FIG. 1 are intended to be representative of their more general classes. In general, use of any specific exemplar herein is also intended to be representative of its class, and the non-inclusion of such specific devices in the foregoing list should not be taken as indicating that limitation is desired.

Figure 2:
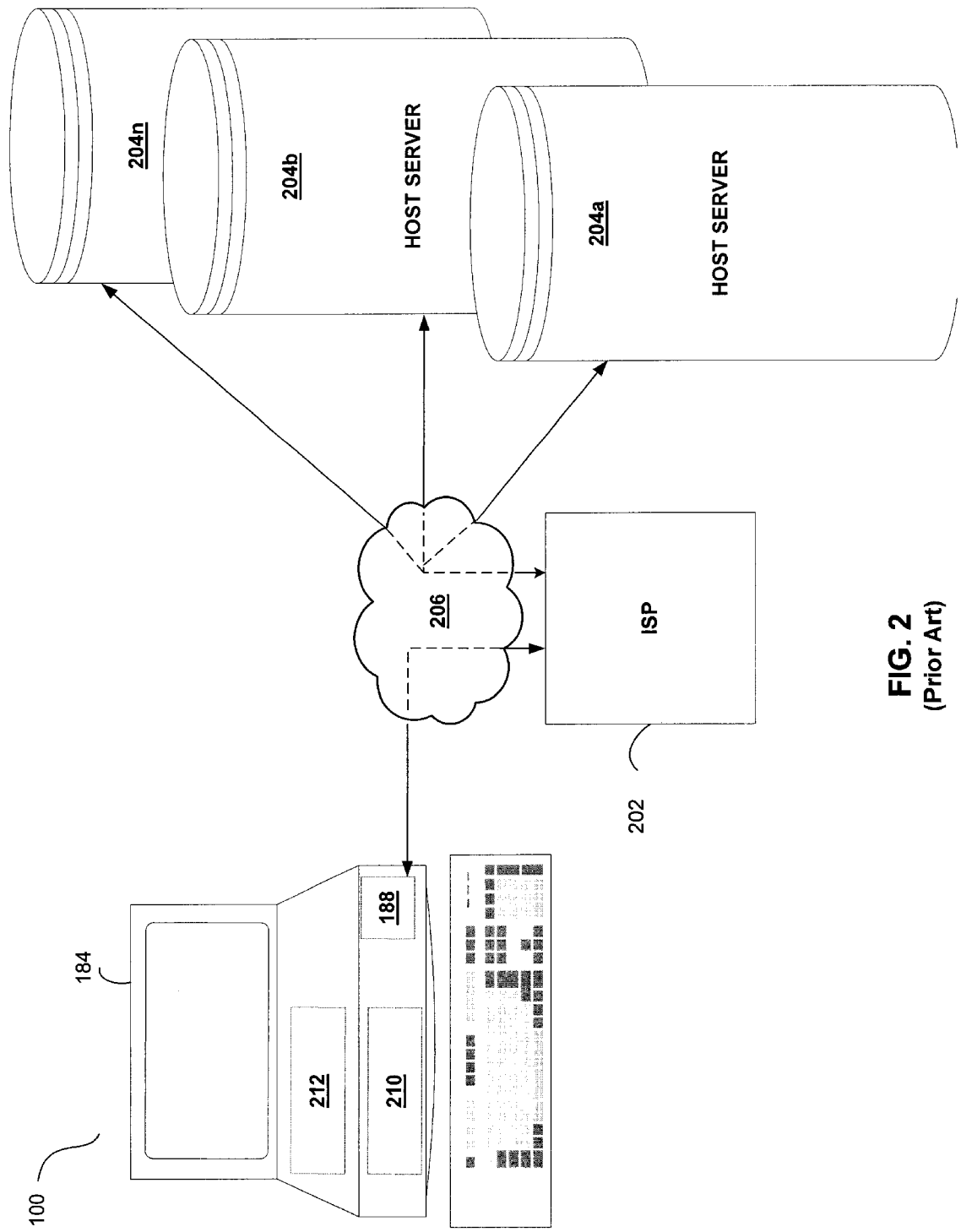
FIG. 2 is a block diagram of one embodiment of an Internet connection.

FIG. 2 illustrates that, when an individual user establishes a connection with the Internet 206 through the services of an ISP 202, the connection usually consists of four basic parts. First, the user interacts with a client computer 100, the client computer being a PC computer system or similar device. The client computer 100 includes a modem 188, communications software 210 and "browser" software 212. The modem 188 is the physical means by which the client computer 100 sends and receives communications to and from other computers and networks, including the Internet 206. The communications software 210 provides software support for those communications.

The second part of the connection is the ISP 202. The ISP 202 acts as a conduit for individuals to connect to the third part of the connection, the third part being the host computer, known as the "server" 204, at the other end of the connection. The ISP 202 receives a request for access from the client computer 100. Typically, the ISP 202 includes a collection of modems that accept multiple incoming requests simultaneously.

The ISP 202 processes the request and connects the user computer 100 to the Internet "backbone", the backbone being very high-capacity lines that carry large amounts of Internet traffic. Several different data communication lines are available to connect a computer or computer system to the Internet. Common data communication lines include, but are not limited to, analog modems (14.4 Kbaud–56 Kbaud), ISDN (Integrated Services Digital Network), T1 lines, and Fractional T1 lines.

The third part of the Internet connection is the host server 204. The host runs special software that receives and reads requests sent from the browser 112. The browser 121 sends requests to a specific server computer 204a, 204b, 204n on the Internet to retrieve a specific document or Web page, once the Internet connection is established. Host servers 204 differ from typical client computers 100 in that host servers 204 can handle multiple telecommunications connections at one time. The host server 204 retrieves the appropriate information to be sent to the client computer 100. The server computer 204 is connected to the Internet backbone, and sends the appropriate information back to the client computer 100.

The fourth part of the Internet connection is the communications networks 206 that link together the first three components 100, 202, 204. FIG. 2 illustrates that the Internet connection is complete when the request from the client computer 100 results in a link being established with the host server 204.

Figure 3A:
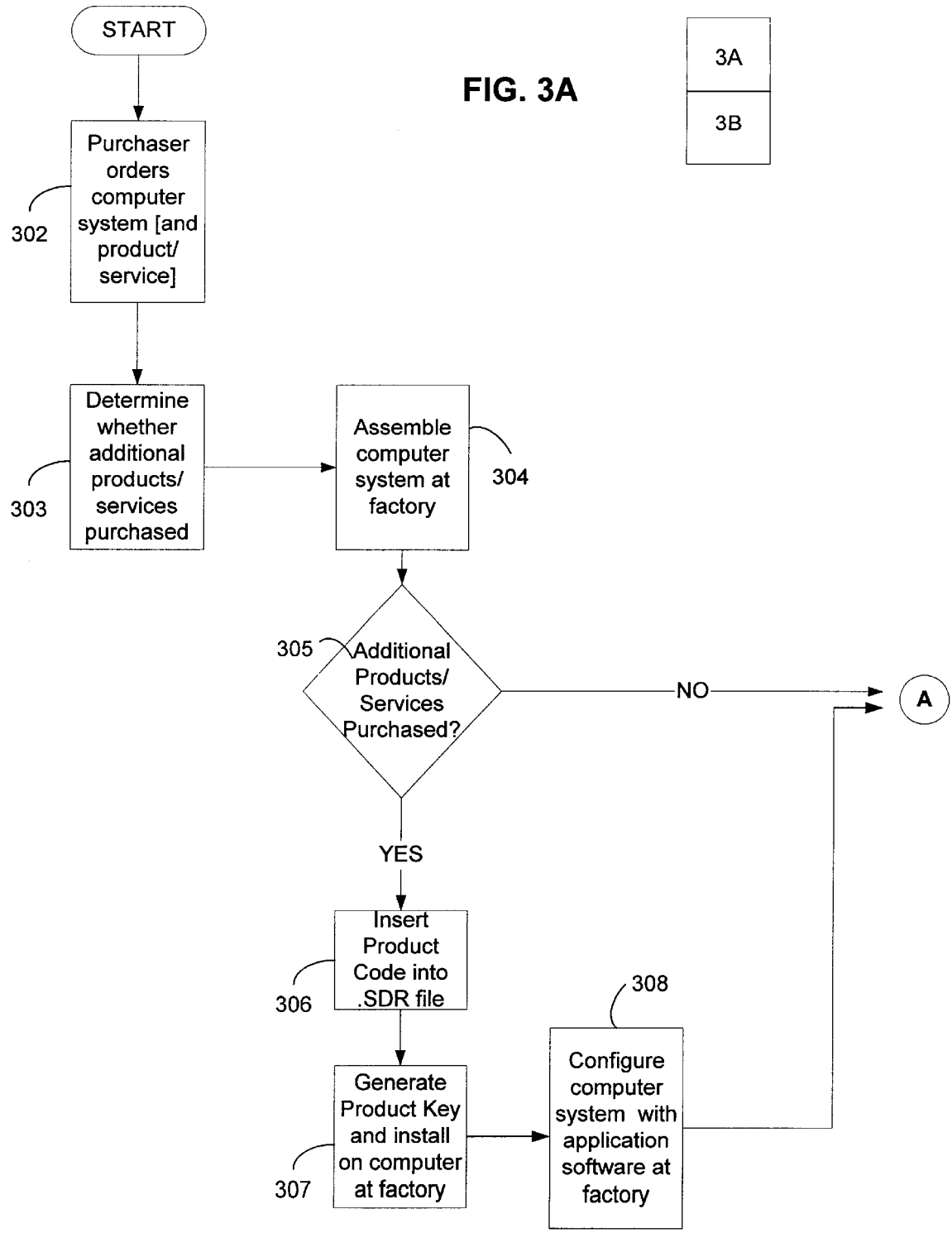
FIG. 3A and FIG. 3B, is a flowchart of illustrating a method of purchase verification.

FIG. 3, which includes FIGS. 3 and 3A, illustrates a method for purchase verification. In this context, the terms "purchase" and "pre-paid" shall be interpreted to mean any situation where the purchaser has ordered a service, benefit, or good and has also made an acceptable provision for payment thereof. The purchaser may have paid in full through cash, money order, check or credit card. Or, the purchaser may have made provisions for an installment payment schedule or for cash-on-delivery ("C.O.D") payment. Furthermore, in the case of promotional services and products, the "purchase" is complete when the purchaser accepts or orders a no-cost service or product. For instance, a purchaser could order a computer system, a pre-paid ISP service contract from an ISP provider, and a promotional offer of one free digital video movie stream from a commercial video rental provider. The purchaser may charge the computer system to her credit card, make provision to have a monthly ISP service fee automatically deducted from her checking account, and receive the video stream free of charge.

FIG. 3A illustrates that the purchase verification process begins in operation 302 when the purchaser orders a computer system 100. At the time of order, the purchaser may, or may not, purchase additional goods, services, or other benefits. In operation 303 it is determined whether or not the purchaser has purchased goods or services in addition to the computer system 100. In at least one embodiment, this determination is made by the manufacturer's sales personnel. If it is determined that such a purchase has been made, then the sales personnel notes the purchase in a manner that makes the information accessible to the factory personnel that assemble the computer system 100.

In operation 304 the computer system 100 is assembled at the manufacturer's factory by a factory installer. The factory installer function may be performed by a person, by a software program, or a by a combination of the two. After the hardware is physically assembled, the proper software is configured and installed. In at least one embodiment, this configuration process involves installing the operating system and any other software that the purchaser has requested, The PKey is generated in operation 307 by running the MD5 hashing algorithm on an ASCII input string. The MD5 hashing algorithm is well-known and is further described in "The MD5 Message-Digest Algorithm", *Request for Comments 1321*" by R. Rivest, April 1992, MIT Laboratory for Computer Science and RSA Data Security, Inc., which is incorporated herein by reference.

The MakePKey utility generates the PKey and stores the value of the PKey in the Windows™ operating system's registry file. The registry file resides in non-volatile memory 152 (FIG. 1). In addition, MakePKey generates other keys and stores them in the registry file as well. These additional keys support a software application (DNSIGNUP, described immediately below) with system-specific information. These additional keys include the following:

| Registry Key | Value/Size | Type | Initial Value |
| --- | --- | --- | --- |
| HKEY_LOCAL_MACHINE/Software/Dell/DellNet/MakePKeyVer | MakePKey Version Number, 4 bytes | String | First instance is "1.00" |
| HKEY_LOCAL_MACHINE/Software/Dell/DellNet/SecretVer | Encryption Version Number, 4 bytes | String | First instance is "1.00" |
| HKEY_LOCAL_MACHINE/Software/Dell/DellNet/ProductVer | Product Version Number, 4 bytes | String | First instance is "1.00" |
| HKEY_LOCAL_MACHINE/Software/Dell/DellNet/ServiceTag | Service Tag, 6 bytes | String | n/a |
| HKEY_LOCAL_MACHINE/Software/Dell/DellNet/Product | Product Code, 5 bytes | String | n/a |
| HKEY_LOCAL_MACHINE/Software/Dell/DellNet/ProductKey | Product Key, 16 bytes | Binary | n/a | including spreadsheet software, games, screensavers, word processing software, educational and reference software, and the like. In operation 305, the factory installer determines whether any additional pre-paid goods, services, or benefits have been purchased. This determination is based on the information noted by the sales personnel in operation 303. If additional products, services, or benefits ("benefits") have been purchased, then a product key is installed onto the computer system 100 at the factory, as described below. If not, then the computer is shipped to, and received by, the purchaser in operation 309.

If the factory installer determines, in operation 305, that pre-paid goods, services, or benefits have been purchased, a product key needs to be installed. As an initial step toward installation of a product key, operation 306 is performed. In operation 306, a Product Code is inserted into an ".SDR" file. The Product Code is a code that corresponds to the particular pre-paid item that has been identified in operation 303 as having been purchased by the purchaser. The ".SDR" file is a hidden text file bearing the extension ".SDR". The .SDR file is a log file created at the factory to store certain information about the system and other services, products and other benefits purchased with the system, such as the Product Code. Information from the .SDR file is used as an input to the MakePKey utility described immediately below. In an alternative embodiment, MakePKey does not access an .SDR file but, instead, retrieves information directly from the Basic Input/Output System (BIOS) area of the computer system 100.

In operation 307, a utility, "MakePKey" generates a Product Key corresponding to the pre-paid item. The MakePKey utility is run at the factory when the computer system 100 is assembled and configured. The Product Key ("PKey") is, in at least one embodiment, a 16-byte binary-valued "fingerprint" or "message digest". As used herein, a "byte" is an eight-bit quantity.

The MakePKey utility is deleted from the computer system 100 in operation 307, after the PKey and the other keys described above are generated. The deletion is a security measure to guard against reverse-engineering and other unauthorized attempts to discover the value of the PKey.

In addition to generating the Product Key in operation 307, the factory installer also installs specialized application software related to the PKey. This specialized application software is installed onto the computer system 100 in operation 308. The specialized application software includes a Client Signup Application ("CSA"), called DNSIGNUP.EXE in the preferred embodiment. The CSA is, in at least one embodiment, a 32-bit Windows™ application that walks the purchaser through the process of establishing an account with the provider from whom the purchaser has purchased the pre-paid good or services. In the preferred embodiment, the CSA helps the purchaser establish a pre-paid Internet account with a particular ISP. In an alternative embodiment, the CSA helps the purchase establish an account with a provider even when the purchaser has not pre-paid for services but, rather, wishes to establish a new account and begin payment. The CSA also configures an appropriate dial-up Internet connection through which the purchaser can access the Internet account from the computer system 100. The CSA also configures the computer system 100 to use the configured dial-up Internet connection as the default connection for use by the computer system 100 when accessing the Internet.

The second piece of application software that is installed on the computer system 100 in operation 308 is scripting software. In the preferred embodiment, the scripting software configures the computer system 100 to display the appropriate default Web page when the purchaser uses the computer system 100 to access the Internet through the ISP 202. The scripting software also configures the system to display an appropriate default search page and a default support page.

Figure 3B:
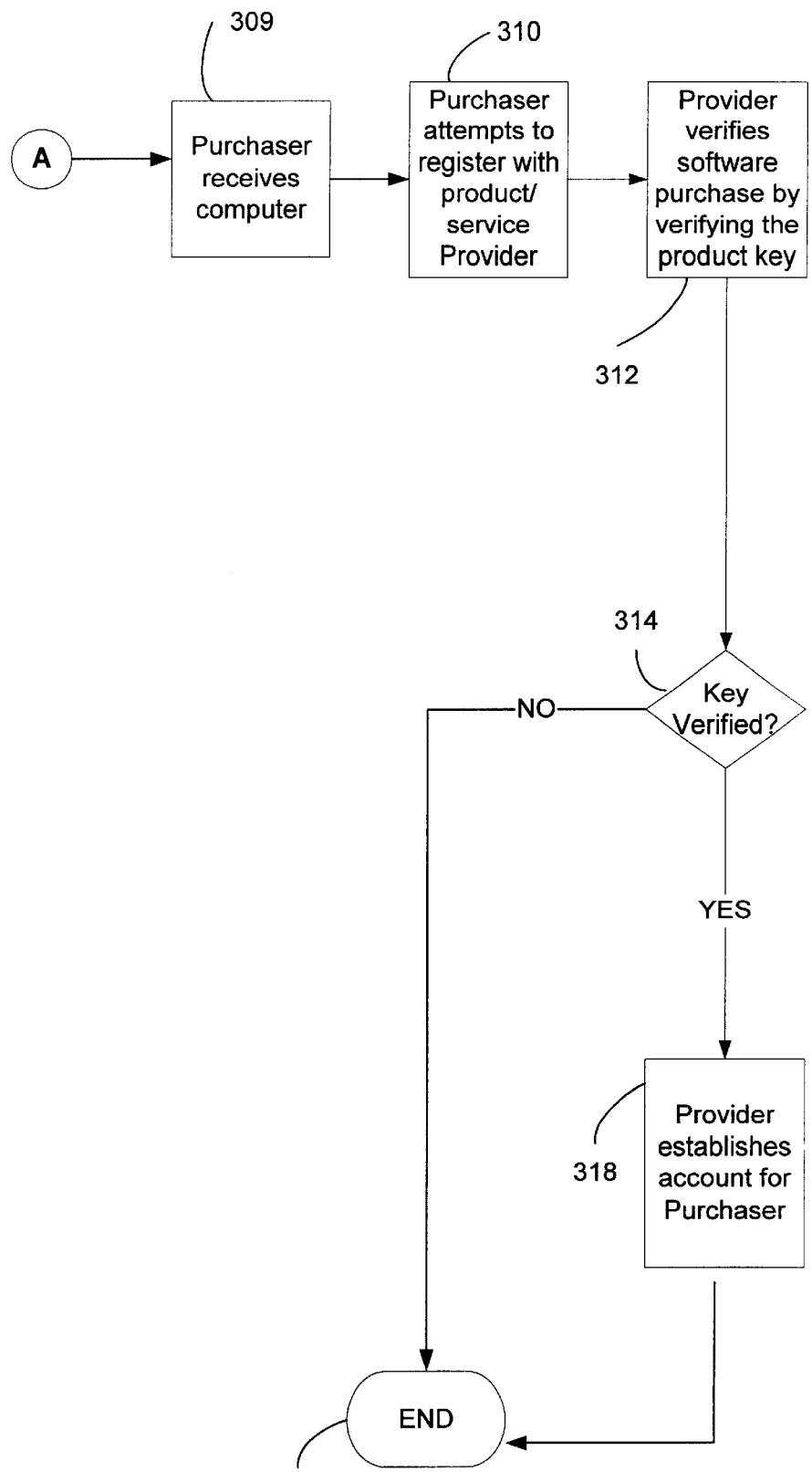

FIG. 3B illustrates that after the PKey, specialized registry keys, and specialized application software have been installed on the computer system 100 at the factory, the computer system 100 is sent to, and received by, the purchaser in operation 309. In operation 310, the purchaser then attempts to access goods or services from a provider that offers pre-paid items with the purchase of a computer system 100. In at least one embodiment, the CSA is installed in operation 308 on each particular computer system 100 assembled by the manufacturer, regardless of whether the purchaser of the particular computer system 100 has actually purchased pre-paid goods, services, or benefits. This enables the purchaser to easily purchase good, services, or benefits (sometimes referred to collectively herein as "benefit") from the provider after the purchaser has received the particular computer system 100.

FIGS. 2 and 3B illustrate that, in operation 310, the purchaser executes the CSA to register with a provider of pre-paid goods, services, or benefits. In the preferred embodiment, the CSA helps the purchaser register via the Internet 206 with the ISP 202 from whom the purchaser has purchased pre-paid ISP services. A more detailed discussion of the CSA is set forth below in connection with FIG. 6A.

FIG. 3B illustrates that, in operation 312, the ISP receives the PKey from the CSA and attempts to verify it. If the ISP determines in operation 314 that the PKey has been verified, the ISP establishes an account for the purchaser in operation 318. The verification and authorization operations, 312 and 318, respectively, are discussed in greater detail below in connection with FIGS. 6B and 7, respectively.

FIG. 3B further illustrates that, if the ISP cannot verify the PKey, then the purchase verification process is exited in operation 316 without a new account being created for the purchaser.

Figure 4:
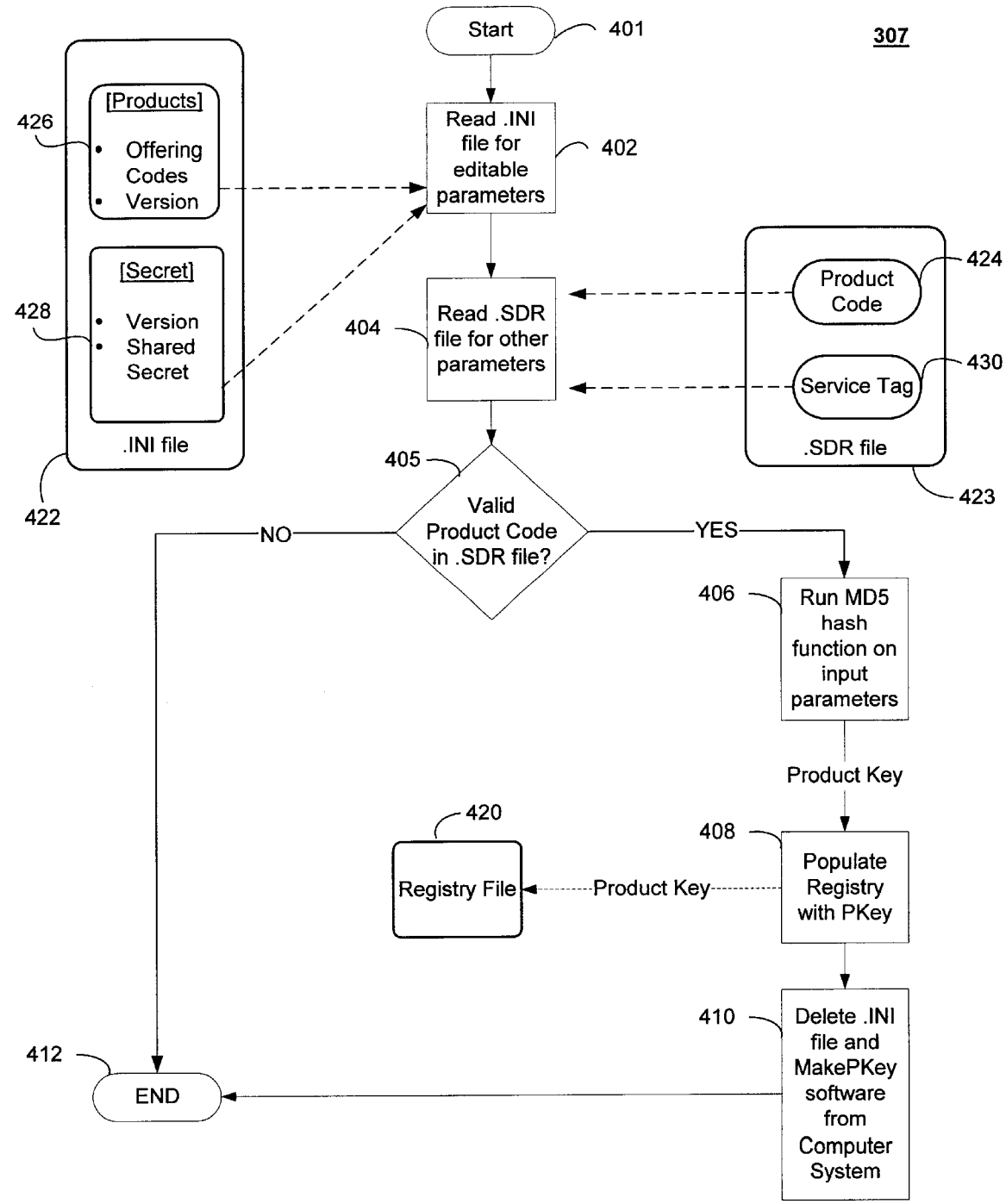
FIG. 4 is a flowchart illustrating the generation and installation of a product key.

FIG. 4 is a flowchart illustrating operation 307 in more detail. In operation 307, as discussed above, the PKey is generated by the MakePKey utility. The MakePKey code is then deleted from the computer system 100. MakePKey is a utility that is used during assembly of the computer system 100 at the factory. MakePKey formats various inputs into a string, the string serving as the input for the MD5 hashing algorithm that generates the Product Key. The Product Key and the input values used to create it, except for the shared secret, are stored, according to at least one embodiment, in the Windows™ operating system's registry file 420.

Figure 5:
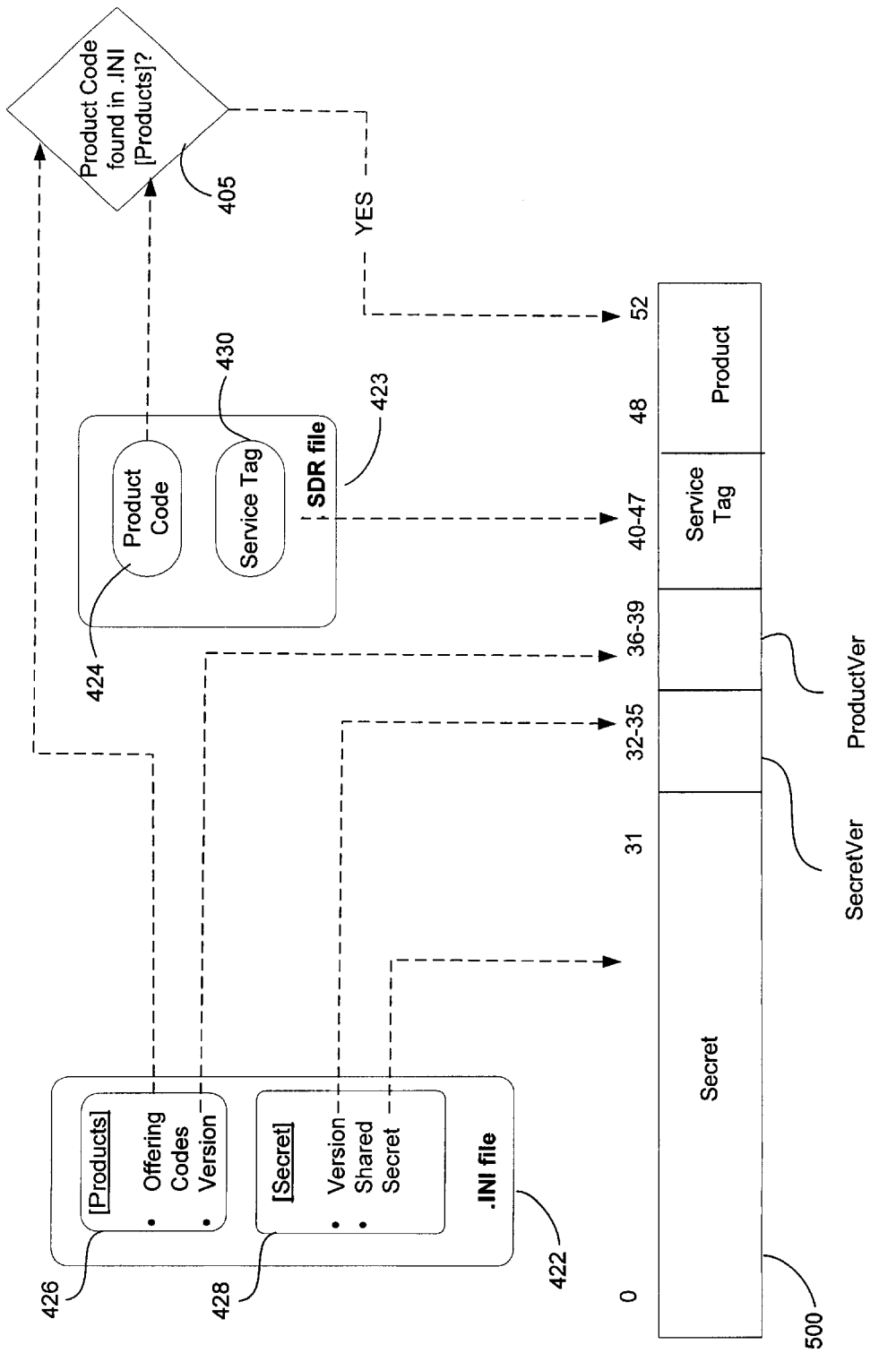
FIG. 5 is a data flow diagram illustrating the formatting of an input string for generation of a product key.

FIG. 5 illustrates that the ASCII string 500 that serves as the input to MakePKey's hashing algorithm includes the fields as described below in Table 1. The ASCII input string 500 is one string, while the component fields of the string are not themselves true strings because there is not a terminating "null" character at the end of each field. Instead, fields whose data does not occupy the entire allocated space are zero-padded on the right. For instance, if a particular value for the 8-character service tag field includes only 5 characters (i.e., "X10Q"), the MakePKey utility right-pads the ServiceTag field with three zeros, yielding a value of "X10Q000".

TABLE 1

| OFFSET | SIZE (characters) | TYPE | FIELD NAME | DESCRIPTION |
|---|---|---|---|---|
| 0 | 32 | ASCII | Secret | Shared secret. |
| 32 | 4 | ASCII | SecretVer | Shared secret version |
| 36 | 4 | ASCII | ProductVer | Product Version |

TABLE 1-continued

| OFFSET | SIZE (characters) | TYPE | FIELD NAME | DESCRIPTION |
|---|---|---|---|---|
| 40 | 8 | ASCII | ServiceTag | System Service Tag. |
| 48 | 5 | ASCII | Product | Product code. |

FIG. 5 illustrates that the "Secret" field described in Table 1 is a 32-character alpha-only field whose value, the "shared secret", is known only to the manufacturer and the provider of "benefits". In the preferred embodiment, the shared secret is shared between the computer system manufacturer and the ISP. The value of the shared secret is distributed, in the preferred embodiment, only to a small number of people who have a direct need to know the shared secret value in order to write and maintain the manufacturer's and ISP's purchase verification software. FIG. 5 illustrates that MakePKey obtains the value of the Secret field from a [Secret] section 428 in an initialization (".INI") file 422. The .INI file 422 is discussed in greater detail below.

The "SecretVer" field is a four-character alpha-numeric field that identifies which version of the shared secret is being used as an input to the MakePKey utility. If the manufacturer and the ISP change the value of the shared secret, the value of the Secret field is updated accordingly, and the value of the SecretVer is incremented. The initial value for SecretVer is a four-character ASCII value of "1.00". As it does with the Secret field, the MakePKey utility obtains the value of the SecretVer field from the [Secret] section 428 of the .INI file 422 discussed below.

The "Product" field in the input string for MakePKey's hashing function is a 5-character alpha-numeric ASCII field that holds as its value a Product Code. The Product Code is extracted from the .SDR file. To find the Product Code, the MakePKey utility scans through the .SDR file and searches for the first line whose first word is "INFO", and whose second word is a valid product offering code listed in the [Products] section of the .INI file discussed below. If none of the Product Offering Codes listed in Table 2, below, are found in the .SDR file, then the purchaser has not purchased any pre-paid ISP service.

The "ProductVer" field is a four-character alpha-numeric field that identifies the version of the product offerings listed in the [Products] section 426 of the .INI file 422 discussed below. The field is used to distinguish between different possible types or families of product offerings. The ProductVer field is a fixed-point decimal string of the format M.mm, where "M" is the major version number and "mm" is the minor version number. The initial value of ProductVer is a four-character ASCII value of "1.00".

The "ServiceTag" field is an 8-character alpha-numeric field. The value of the ServiceTag uniquely identifies the computer system and is akin to a serial number. In the preferred embodiment, a unique ServiceTag is associated with each computer system 100 with which pre-paid goods or services may be purchased, regardless of whether such goods or services are actually purchased when the computer system 100 is ordered from the manufacturer. The ServiceTag uniquely identifies the computer system 100 and is present on the computer system 100 in readable form at the time the MakePKey utility executes. In the preferred embodiment, the Service Tag is extracted by the MakePKey utility from the .SDR file. MakePKey 306 scans through the .SDR file and searches for the first line whose first word is "HW" and whose second word is "snum". The third word on that line is the 8-character ServiceTag.

Returning to FIG. 4, a detailed flowchart of operation 307 illustrates that operation 307 includes operations 402 through 412. In operation 402 the MakePKey utility reads an initialization (".INI") file 422 to retrieve user-editable parameters. In this context, a "user" is a factory employee responsible for maintaining the MakePKey software at the factory. In at least one embodiment, the .INI file 422 follows the standard Windows™.INI file format and contains user-editable parameters that support the MakePKey utility. By using the .INI file 422, the user can change or add to the list of offered product codes and can change the shared secret without recompiling the MakePKey software.

In at least one embodiment, one user-editable parameter that is stored in the .INI file 422 is a list of product offerings. The list of product offerings is maintained in a "[Products]" section 426 of the .INI file 422. The [Products] section specifies information relevant to the products offered by the manufacturer at the time a computer system 100 is ordered by a purchaser.

The product offerings list in the [Products] section 426 of the .INI file 422 contains a list of product offering values, where each value represents a product that is offered for purchase at the time a computer system 100 is ordered by a purchaser. It is these values that the MakePKey utility searches for in the .SDR file 423. Table 2 contains an exemplary list of list of product offerings according to at least one embodiment, wherein pre-paid ISP service is available at the time of purchase of a computer system 100.

TABLE 2

| PRODUCT OFFERING CODE | DESCRIPTION |
| --- | --- |
| DNTST | Test Account. |
| 0867T | 1 month pre-paid subscription to ISP services |
| 1867T | 6 month pre-paid subscription to ISP services |
| 2867T | 1 year pre-paid subscription to ISP services |
| 3867T | 2 year pre-paid subscription to ISP services |
| 4867T | 3 year pre-paid subscription to ISP services |
| 5867T | 4 year pre-paid subscription to ISP services |

FIG. 4 illustrates that the [Products] section 426 of the .INI file 422 also includes a Version value. The Version value of the [Products] section 426 is a four-character, fixed-point decimal string of the format M.mm, where "M" is the major version number of the product offerings list contained in the [Products] section 426, and "mm" is the minor version number. The Version value of the [Products] section 426 is used to distinguish between different types or families of product offerings. An example of a Version value of the [Products] section 426 is: "1.00".

FIG. 4 illustrates that the .INI file 422 includes, in addition to the [Products] section 426, a [Secret] section 428. The [Secret] section 428 includes a Version value and also includes the shared secret. The Version value in the [Secret] section 428 is a four-character, fixed point decimal string of the format M.mm, where "M" is the major version number of the shared secret and "mm" is the minor version number. The Version field of the [Secret] section 428 is used to distinguish between different shared secret values. An example value for the Version field of the [Secret] section 428 is: "1.00".

The [Secret] section 428 includes, in addition to the Version value, the shared secret. The shared secret consists of thirty-two alpha-numeric characters. Whenever the value of the shared secret changes, it must be changed by both the manufacturer and the provider to the same, new, value. Otherwise, the provider's attempts to validate factory-generated product keys will fail.

FIGS. 4 and 5 illustrate that, after the MakePKey utility has read the .INI file to retrieve editable parameters in operation 402, it then reads the .SDR file 423 in operation 404 to retrieve the Product Code 424 and Service Tag 430. The Product Code 424 and the Service Tag 430 are formatted into the Product and Service Tag fields, respectively, of the ASCII input string 500 for the MD5 hash function. In operation 405, MakePKey determines whether the .SDR file 423 contains a value for the Product Code 424 that is also listed in the offering codes list of the [Products] section 426 of the .INI file 422. If not, MakePKey immediately exits and a Product Key is not generated.

If it is determined in operation 405 that the .SDR file 423 contains a valid Product Code 424, then MakePKey runs the MD5 hash function. The hash function is executed in operation 406, using the ASCII string 500 as an input. The output of the hash function is the Product Key. The Product Key and the input values used to create it, except for the shared secret, are stored in the Windows™ operating system's registry file 420 in operation 408. In operation 410, the .INI file 422 and the MakePKey software are deleted from the computer system 100.

Figures 6, 6A:
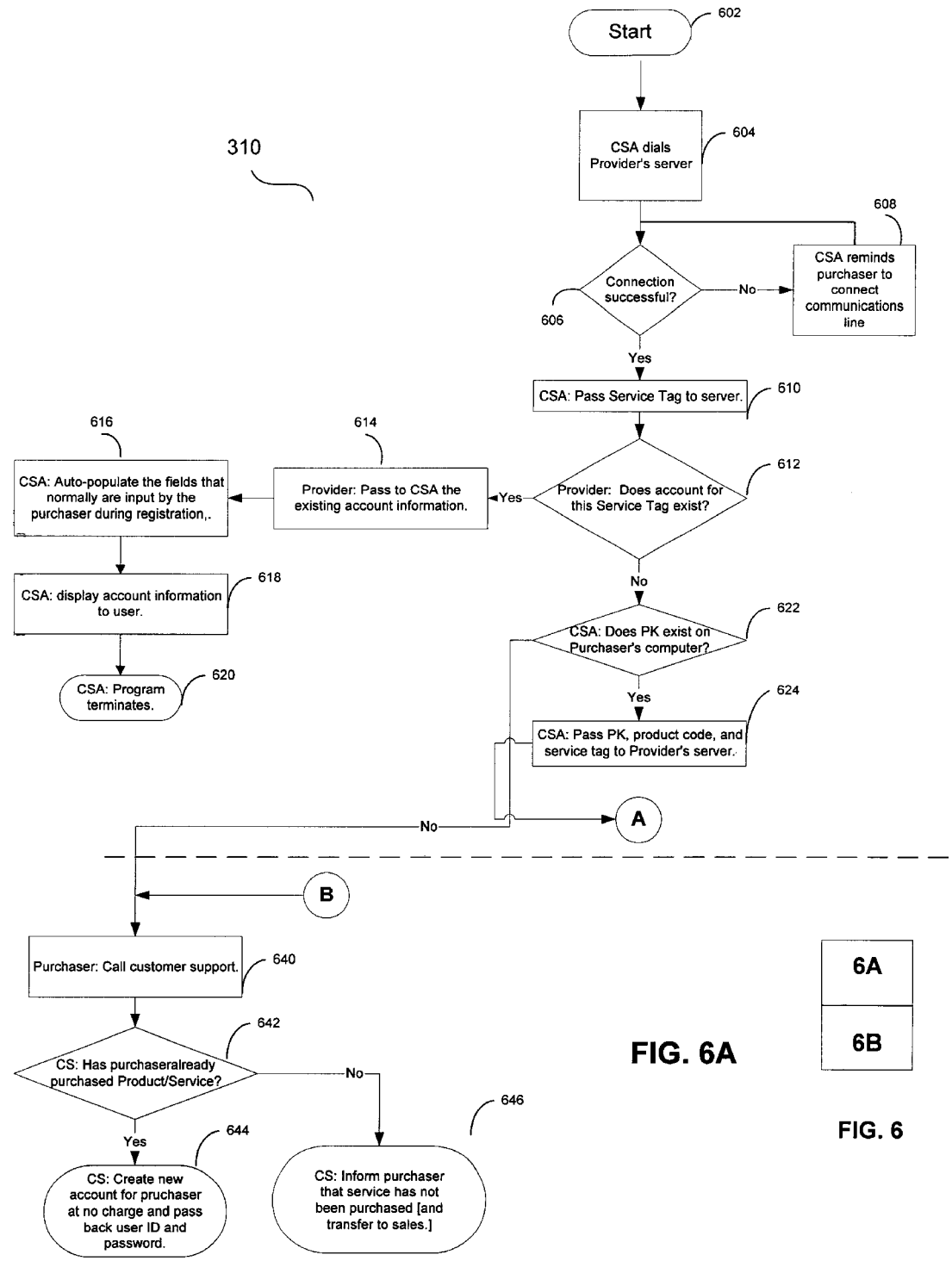
FIG. 6, including
FIG. 6A and FIG. 6B, is a flowchart of illustrating a client signup application.

FIGS. 2 and 6A illustrate the control flow during execution of the Client Signup Application (CSA) when the purchaser attempts to register with the product/service provider in operation 310 (FIG. 3B). FIG. 6A illustrates that the operations of the CSA that are performed when the purchaser attempts to register with the Provider flow basically sequentially from operation 602 to operation 624. In operation 602, the purchaser begins execution of the CSA, which is installed on the computer system 100. In operation 604, the CSA attempts to establish an Internet connection with the Provider's host server 204. If it is determined in operation 606 that the connection has not been successfully established, then the CSA reminds the purchaser, in operation 608, to connect a communication line, such as a telephone cord, into the modem 188. The reminder is displayed to the purchaser via a message displayed on the monitor 184. After displaying the reminder in operation 608, the CSA returns to operation 606 to determine whether an Internet connection has been successfully established.

If an Internet connection with the Provider's host server 204 is successfully established, then the CSA, in operation 610, provides the Service Tag 430 to the Provider's host server 204 via the Internet 206. Using the Service Tag 430 value, the Provider's host server 204 determines in operation 612 whether the Provider has already established an existing account corresponding with the Service Tag 430. The Provider will already have an established account corresponding to the Service Tag 430 if the purchaser has already previously run the CSA to establish an account corresponding to the purchaser's particular computer system 100.

If an account corresponding to the Service Tag 430 already exists, then the Provider passes to the CSA, in operation 614, information concerning the existing account. In operation 616, the CSA receives this information and auto-populates fields that would otherwise be manually entered by the purchaser during execution of the CSA when a new account is created. In operation 618 the CSA then displays information concerning the existing account to the user via the monitor 184, and execution of the CSA then terminates in operation 620.

If the Provider determines in operation 612 that no existing account corresponds to the Service Tag 430, then the CSA performs operation 622. In operation 622 the CSA determines whether a Product Key exists in the Windows®registry file 420 of the purchaser's computer system 100. Under normal operation, there will be a Product Key in the registry file 420 unless the purchaser has not purchased a pre-paid product, service, or benefit. However, a purchaser who has purchased a pre-paid product, service, or benefit may nonetheless fail to have a Product Key on his computer system 100 if the purchaser has, after receiving the computer system 100, formatted the hard drive and hand-installed the Windows™ operating system.

If the Product Key does not exist on the computer system 100, then operations 640 through 646 are performed. In these operations, control is transferred to the purchaser and to the manufacturer's customer service (CS) personnel. In operation 640 the purchaser calls the manufacturer's CS personnel. In operation 642, the CS personnel determine whether the purchaser has already pre-paid for the benefit the purchaser is trying to register for. If so, then CS creates a new account for the purchaser in operation 644. If not, then CS informs the purchaser that the benefit has not been purchased in operation 646. The CS may then refer the purchaser to the manufacturer's sales personnel so that the purchaser can make inquire about, and make arrangements to, purchase the desired benefit.

FIGS. 2, 5 and 6A illustrate that, if the Product Key is detected in operation 622, then the CSA provides the Product Key and the input values used to create it, except for the shared secret, to the Provider's host server 204 in operation 624. The operation of the CSA then continues as illustrated in FIG. 6B.

Figure 6B:
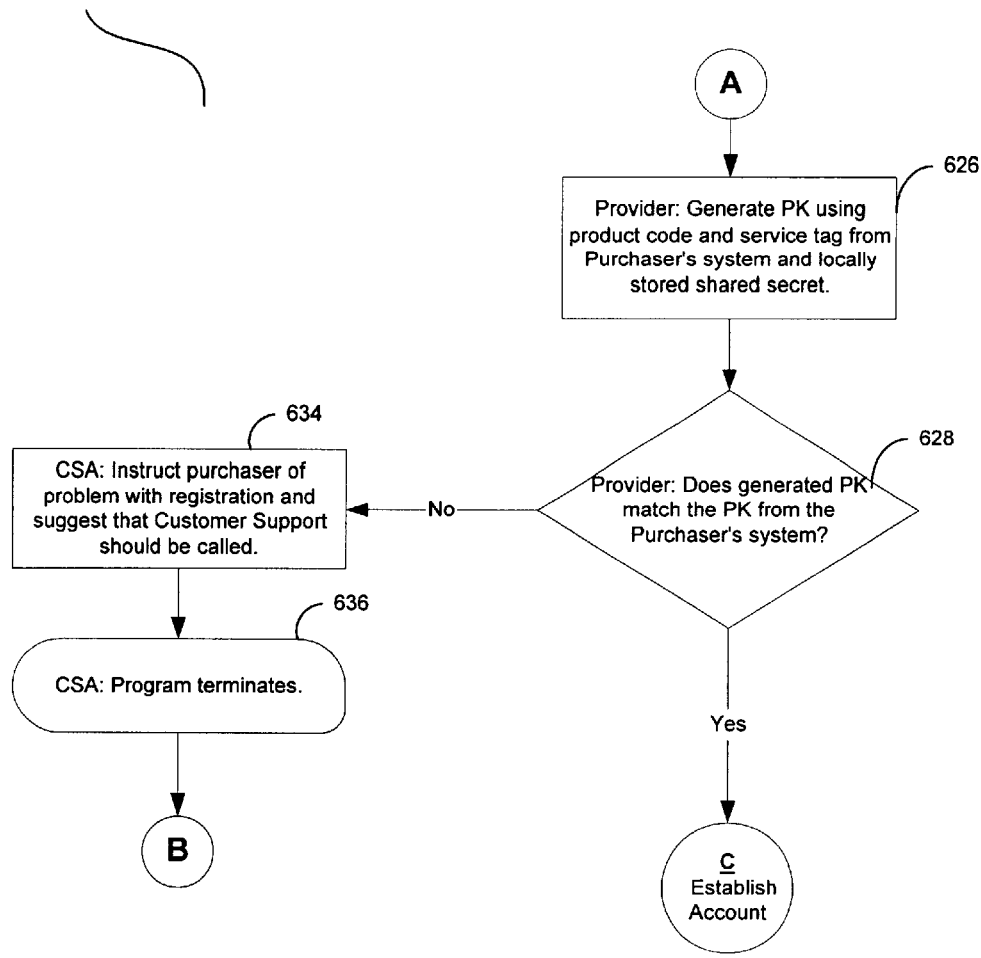

FIG. 6B illustrates the flow of control during execution of operation 312 (FIG. 3B). During the sequential execution of operations 626 through 636, the Provider attempts to verify the Product Key. In operation 626 the Provider's host server 204 generates its own Generated Product Key using the input parameters provided by the CSA and its own locally stored version of the shared secret. When generating the Generated Product Key, the provider uses the same MD5 hashing algorithm used by MakePKey to generate the original Product Key. In operation 628, the Provider determines whether the Product Key provided by the CSA in operation 610 (FIG. 6A) (i.e., the expected product key value) matches the Generated Product Key value generated by the provider in operation 626. If the Product Key values don't match, then the Provider will not authorize a new account to be established for the Purchaser, and so notifies the CSA. The CSA receives the notification and, in operation 634, notifies the purchaser that a problem has occurred with the attempted registration, and suggests, via the monitor 184, that the purchaser contact customer support personnel for the manufacturer. After doing so, the CSA terminates 636. Control is then transferred to the purchaser in operation 640 (FIG. 6A) as described above.

Figure 7:
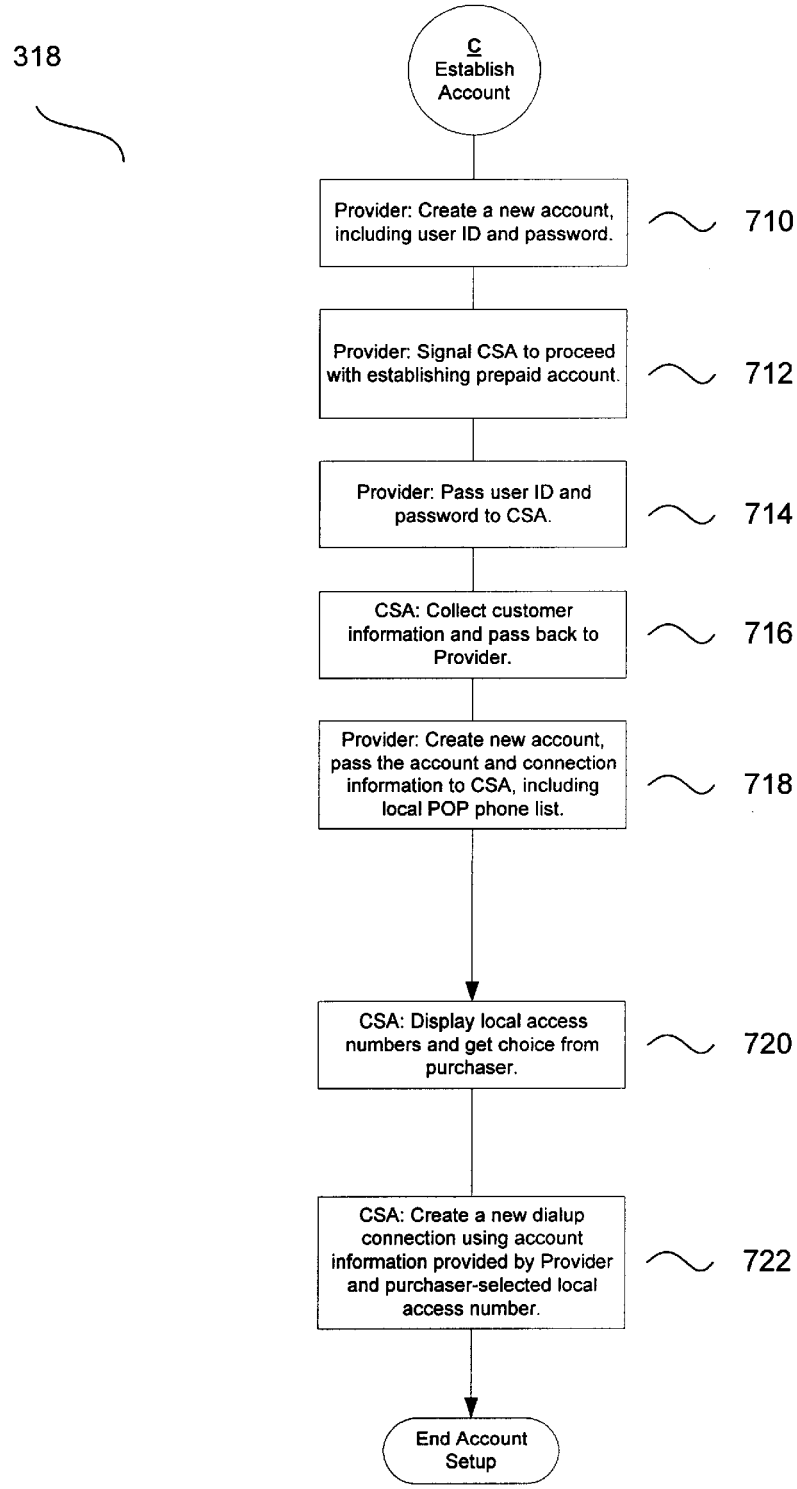
FIG. 7 is a flowchart illustrating a method of establishing a user account.

If the original Product Key and the Generated Product Key values are determined to match in operation 628, then the Provider establishes a new account for the purchaser as illustrated in FIG. 7.

FIG. 7 illustrates, in sequential operations 710 through 722, the interplay of the Provider's host server 204 and the CSA in establishing a new Provider account for the purchaser in operation 318 (FIG. 3B). In operation 710 the Provider establishes a new account that is associated with the purchaser's computer system 100. The Provider also generates a password and user ID associated with the new account.

In operation 712 the Provider then signals the CSA to begin interacting with the purchaser via the monitor 184 to obtain purchaser-specific account information. The Provider then provides to the CSA, in operation 714, the newly created password and user ID that were generated by the Provider in operation 710.

In operation 716 the CSA collects the purchaser-specific account information from the purchaser and provides it to the Provider's host server 204. In operation 716 the CSA also provides connection information. The connection information relates to the particular type of data communication line used to establish the Internet connection between the computer system 100 and the host server 204. In operation 718 the Provider's host server 204 receives the purchaser-specific account information and the connection information from the CSA.

Using this information, the Provider populates the new account with the purchaser-specific information and connection information in operation 718. The Provider then forwards the connection information back to the CSA. In operation 718 the Provider also sends to the CSA a list of local access phone numbers from which the purchaser may choose when attempting to establish future Internet connections with the Provider's host server 204. In operation 720 the CSA then displays the list of local access numbers, via the monitor 184, to the purchaser. The CSA prompts the purchaser to choose one of the numbers.

In operation 722 the CSA establishes a new Internet connection using the account information provided by the Provider in operation 718 and the local access number selected by the purchaser in operation 720. In an alternative embodiment, the CSA establishes the new Internet connection using a default local access number, without prompting a selection from the purchaser. As a result, a new Provider account is established for the purchaser and an Internet connection with the Provider is established for the computer system 100 so that the purchaser can now access the pre-paid goods, services or other benefits.

Those skilled in the art will recognize that, based upon the teachings herein, several modifications may be made to the embodiments described above. For example, while the Product Key may be used to verify whether a purchaser has pre-paid for ISP services at the time of a computer system 100 purchase, the product key could alternatively be used to verify the purchase of any good, service, or other benefit. In addition, the order of the operations performed in FIGS. 3, 4, 6, and 7 need not necessarily be performed in the exact order set forth in such Figures. Rather, the operations may alternatively be performed in any order that preserves the function described herein.

Particular embodiments of the present invention have been shown and described. It will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for generating a purchase verification key, comprising:

obtaining a service tag value that uniquely identifies a computer system, the computer system including a processor coupled to a non-volatile memory;

obtaining a product code value the product code value corresponding to a particular pre-paid item, the particular pre-paid item being purchased when the computer system is purchased;
obtaining a shared secret value;
hashing an input string to generate a product key, the input string including the service tag value, the product code value, and the shared secret value; and
storing the service tag value, product code value, and the product key in the non-volatile memory.

2. A method for purchase verification, comprising:
generating an original product key that uniquely identifies a computer system, the product key including information corresponding to a particular pre-paid item being purchased when the computer system is purchased, the computer system including a processor coupled to a non-volatile memory;
storing the original product key in the non-volatile memory when the computer system is assembled at a factory;
retrieving the original product key from the non-volatile memory;
generating a generated product key;
verifying that the generated product key is equivalent to the original product key; and
authorizing a purchaser to receive a benefit if the generated product key is equivalent to the original product key.

3. The method as recited in claim 2, further comprising:
installing application software in the non-volatile memory when the computer system is assembled at the factory.

4. The method as recited in claim 3 wherein the application software is a factory installation application.

5. The method as recited in claim 2, wherein the generating an original product key further comprises:
obtaining a service tag value that uniquely identifies the computer system;
obtaining a product code value that identifies the benefit;
obtaining a shared secret value; and
hashing an input string to generate a message digest, the input string including the service tag value, the product code value, and the shared secret value.

6. The method as recited in claim 2, wherein the benefit is ISP service.

7. The method as recited in claim 2, wherein the generating a generated product key further comprises:
obtaining a service tag value that uniquely identifies the computer system;
obtaining a product code value that identifies the benefit;
obtaining a locally-stored shared secret value; and
hashing an input string to generate a message digest, the input string including the service tag value, the product code value, and the locally-stored shared secret value.

8. An apparatus comprising:
a processor;
a non-volatile memory coupled to the processor; and
program code stored by the main memory and executable by the processor, the program code including instructions for:
generating a product key that uniquely identifies a computer system, the product key including information corresponding to a particular pre-paid item being purchased when the computer system is purchased; and
storing the product key in the non-volatile memory when the computer system is assembled at a factory;
wherein instructions for generating a product key further comprise:
instructions for obtaining a service tag value that uniquely identifies the computer system;
instructions for obtaining a product code value that identifies a benefit;
instructions for obtaining a shared value; and
instructions for generating a message digest of an input string, the input string including the service tag value, the product code value, and the shared secret value.

9. The apparatus recited in claim 8, wherein the program code further includes instructions for:
assisting a purchaser to register with a provider.

10. The apparatus recited in claim 8, wherein the program code further comprises deleting the instructions for generating the product key from the non-volatile memory.

11. The computer system recited in claim 8 wherein instructions for generating a message digest include instructions for executing a hash function.

12. The computer system recited in claim 8 wherein the program code further includes instructions for:
communicating with a provider, the provider having the ability to verify the product key.

13. The computer system recited in claim 12, wherein the ability to verify the product key comprises the ability to:
receive the product key from the computer system, the product key comprising an expected product key value;
receive a service tag value from the computer system;
receive a product code value from the computer system;
obtain a locally-stored shared secret value;
hash an input string to generate a generated product key value, the input string containing the service tag value, the product code value, and the locally-stored shared secret value; and
determine whether the generated product key value is equivalent to the expected product key value.

14. The computer system recited in claim 13 wherein the provider is further configured to authorize a purchaser to receive a benefit if the generated product key value is equivalent to the expected product key value.

15. The computer system recited in claim 13 wherein the provider is further configured to establish an Internet Service Provider ("ISP") service account corresponding to a purchaser if the generated product key value is equivalent to the expected product key value.

16. A system that performs purchase verification, comprising:
a computer system, the computer system having a memory coupled to a processor;
a program code, the program code being stored in the memory and executable by the processor, the program code including instructions for generating a product keys the product key including information corresponding to a particular pre-paid item being purchased when the computer system is purchased; and
a provider, the provider being configured with the ability to verify the product key;
wherein instructions for generating a product key further comprise:
instructions for obtaining a service tag value that uniquely identifies the computer system;
instructions for obtaining a product code value that identifies a benefit;
instructions for obtaining a shared value; and instructions for generating a message digest of an input string, the input string including the service tag value, the product code value, and the shared secret value.

17. The system recited in claim 16 wherein the computer system and the provider are configured to communicate over a network.

18. The system recited in claim 16 wherein:

the computer system and the provider are configured to communicate via the Internet;

the computer system includes a modem and a browser; and the provider includes a host server.

19. The system recited in claim 16 wherein the ability to verify the product key comprises:

receiving the product key from the computer system, the product key comprising an expected product key value;

receiving a service tag value from the computer system;

receiving a product code value from the computer system;

obtaining a locally-stored shared secret;

hashing an input string to generate a generated product key value, the input string including the service tag value, the product code value, and the locally-stored shared secret; and determining whether the generated product key value is equivalent to the expected product key value.

20. A computer-readable medium having a computer program accessible therefrom, the computer program comprising instructions for:

generating a product key that uniquely identifies a computer system, the product key including information corresponding to a particular pre-paid item being purchased when the computer system is purchased, the computer system including a processor coupled to a memory;

storing the product key in the memory;

deleting from the memory the instructions for generating a product key; and deleting from the memory the instructions for storing the product key in the memory.

21. The computer-readable medium, as recited in claim 20, comprises any of a magnetic storage medium, including disk and tape storage medium, an optical storage medium, including compact disk memory and a digital video disk storage medium, a nonvolatile memory storage medium, a volatile storage medium, and data transmission medium including packets of electronic data, computer network, point-to-point, and carrier wave transmission medium.

22. A computer-readable medium having a computer program accessible therefrom, the computer program comprising instructions for:

receiving an expected product key value;

receiving a service tag value;

receiving a product code value, the product code value corresponding to a particular pre-paid item being purchased when the computer system is purchased;

obtaining a locally-stored shared secret value;

hashing the service tag value, the product code value, and the locally-stored shared secret value to generate a generated product key value;

verifying that the generated product key value is equivalent to the expected product key value; and authorizing a purchaser to receive a benefit if the generated product key value is equivalent to the expected product key value.

23. The computer-readable medium, as recited in claim 22, comprises any of a magnetic storage medium, including disk and tape storage medium, an optical storage medium, including compact disk memory and a digital video disk storage medium, a nonvolatile memory storage medium, a volatile storage medium, and data transmission medium including packets of electronic data, computer network, point-to-point, and carrier wave transmission medium.

* * * * *